(12) United States Patent
Eichel (10) Patent No.: US 7,656,608 B1
(45) Date of Patent: Feb. 2, 2010

(54) MEDIA CARTRIDGE WITH MULTI-DISTANCE ANTENNAS AND CARTRIDGE EXPORT PREVENTION AND TRACKING MECHANISMS

(75) Inventor: Dale R. Eichel, Bloomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 887 days.

(21) Appl. No.: 11/343,420

(22) Filed: Jan. 31, 2006

(51) Int. Cl.
*G11B 15/68* (2006.01)

(52) U.S. Cl. .................. 360/92.1; 360/132; 720/728; 720/730

(58) Field of Classification Search .............. 720/728, 720/730
See application file for complete search history.

(56) References Cited

U.S. PATENT DOCUMENTS

| | | | | |
|---|---|---|---|---|
| 3,650,378 A | * | 3/1972 | Kakiuchi et al. ............ 206/514 |
| 5,040,385 A | * | 8/1991 | Randone ...................... 70/62 |
| 5,231,273 A | * | 7/1993 | Caswell et al. .............. 235/385 |
| 6,583,753 B1 | * | 6/2003 | Reed ............................ 342/70 |
| 2002/0084903 A1 | * | 7/2002 | Chaco ...................... 340/573.1 |
| 2003/0116634 A1 | * | 6/2003 | Tanaka ....................... 235/492 |
| 2004/0263319 A1 | * | 12/2004 | Huomo ...................... 340/10.2 |

* cited by examiner

*Primary Examiner*—Andrea L Wellington
*Assistant Examiner*—Carlos E Garcia
(74) *Attorney, Agent, or Firm*—Brooks Kushman P.C.

(57) ABSTRACT

The aspects of the present invention provide a device for tracking, a method for tracking, and a method for building the device for tracking the location of a media cartridge. The device includes a first antenna connected to a media unit. The device also includes a second antenna connected to the media unit, wherein the second antenna has a range that is longer than the first antenna. The device also includes a switch, wherein the switch allows the media cartridge to operate in a first mode and a second mode, wherein in the first mode the first antenna is operable, and wherein in the second mode the second antenna is operable.

14 Claims, 4 Drawing Sheets

MEDIA CARTRIDGE WITH MULTI-DISTANCE ANTENNAS AND CARTRIDGE EXPORT PREVENTION AND TRACKING MECHANISMS

BACKGROUND OF THE INVENTION

1. Field of the Invention

The present invention generally relates to an improved device used with a media cartridge storage system. Still more particularly, the present invention relates to a device, a method, and a method for building the device for tracking the location of a media cartridge.

2. Description of the Related Art

Media cartridges are one of the most widely used methods for storing large quantities of data. Many companies store vast amounts of data and backup data on media cartridges. Media cartridges are generally stored in a secure environment or a tape library so that individuals needing access to the information can easily obtain the media cartridge. However, media cartridge tracking issues arise when media cartridges are misplaced, not returned, or otherwise removed from the secure environment.

Currently, the use of a first antenna is one method for tracking the location of a media cartridge. Each media cartridge is connected to a first antenna which transmits a signal to a transponder. However, the first antenna is limited in range and can usually only transmit signals within the secure environment or tape library. Therefore, when the media cartridge leaves the secure environment or tape library, the transponder cannot receive a signal from the first antenna and the location of the media cartridge becomes unknown.

SUMMARY OF THE INVENTION

The aspects of the present invention provide a device for tracking, a method for tracking, and a method for building the device for tracking the location of a media cartridge. The device includes a first antenna connected to a media unit. The device also includes a second antenna connected to the media unit, wherein the second antenna has a range that is longer than the first antenna. The device also includes a switch, wherein the switch allows the media cartridge to operate in a first mode and a second mode, wherein in the first mode the first antenna is operable, and wherein in the second mode the second antenna is operable.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
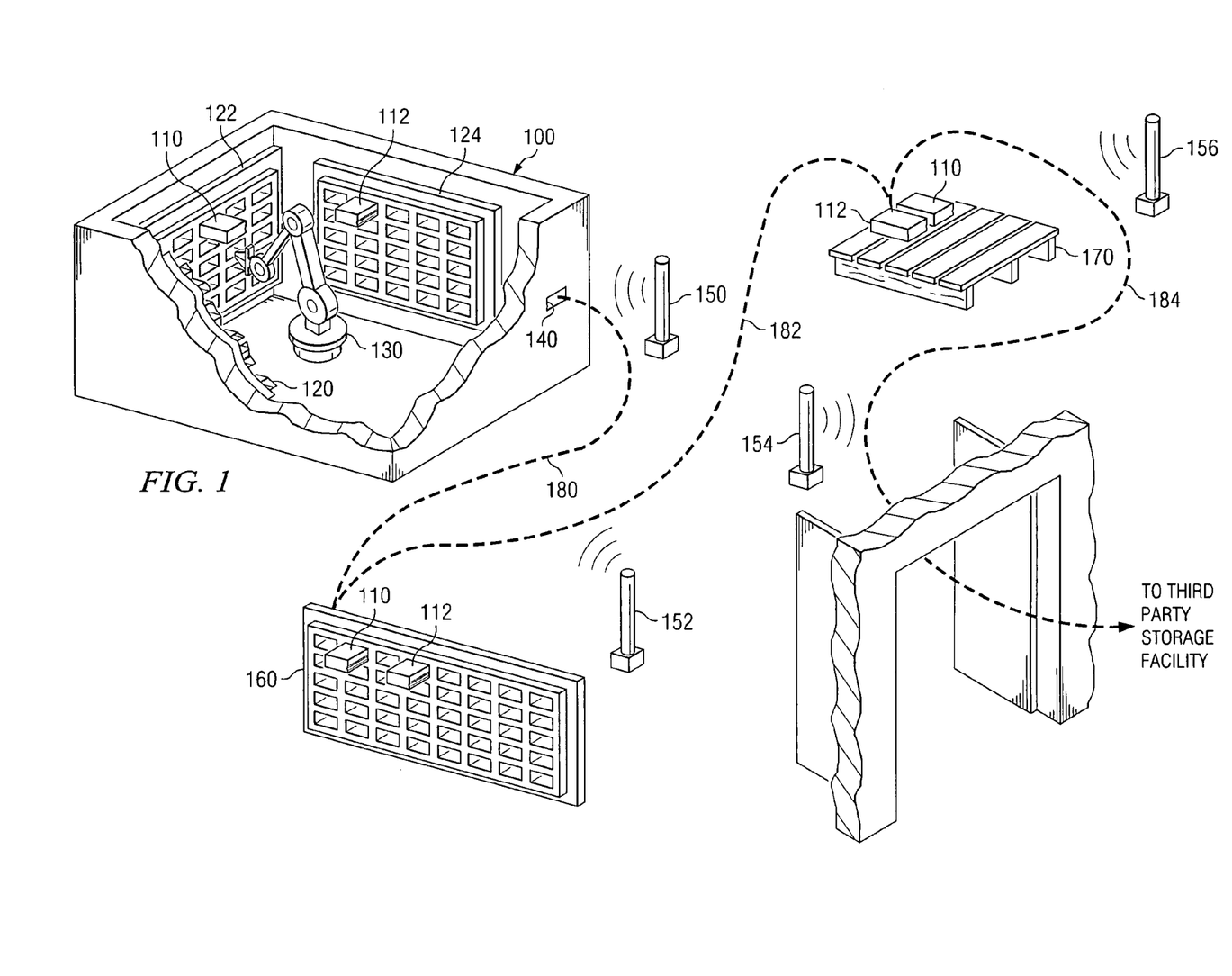
FIG. 1 illustrates a media cartridge environment in which aspects of the present invention may be implemented.

FIG. 1 illustrates a media cartridge environment in which aspects of the present invention may be implemented. In these examples, secure environment 100 is a media cartridge library and stores media cartridges 110 and 112. Secure environment 100 can take other forms, such as, for example, a media array or any other controlled facility that stores and manages media cartridges. Media cartridges 110 and 112 are any media device or media device in a media device carrier. Examples include, but are not limited to, a magnetic tape in a cartridge, a disk drive, a holographic drive, and an optical drive stored in a plastic case.

Media cartridges 110 and 112 are stored in media storage units 122 and 124, respectively, within secure environment 100. Media storage units 120, 122, and 124 are storage racks for the media cartridges, such as media cartridge 110 and 112. In the illustrative embodiment, media storage units 120, 122, and 124 align with three of the walls within secure environment 100. However, media storage units 120, 122, and 124 are not limited to the configuration in the illustrative embodiment. Media storage units 120, 122, and 124 can also be parallel or any other configuration that secure environment 100 can accommodate.

Secure environment 100 uses robot 130 to move media cartridges 110 and 112 between media storage units 120, 122, and 124 and portal 140. Portal 140 is an opening to secure environment 100. Portal 140 allows media cartridges 110 and 112 to pass through. For example, in the illustrative embodiment, if a user requests media cartridge 110, robot 130 retrieves media cartridge 110 from media storage unit 122 and transports media cartridge 110 to portal 140. Media cartridge 110 passes through portal 140, and the user can then remove media cartridge 110 from secure environment 100. When the user is finished with media cartridge 110, the user returns media cartridge 110 to secure environment 100 through portal 140. Robot 130 then stores media cartridge 110 in one media storage unit 120, 122, or 124.

When media cartridges 110 or 112 leave secure environment 100, media cartridges 110 and 112 transmit a radio frequency identifying the location of media cartridges 110 and 112. A transponder, such as transponders 150, 152, 154, and 156 picks up the transmission and keeps track of the location of media cartridges 110 and 112. In the illustrative embodiment, transponders 150 through 156 are dispersed throughout a facility. The aspects of the present invention may include more or less transponders located at different points throughout the facility.

In the illustrative embodiment, media cartridges 110 and 112 may move from secure environment 100 to storage rack 160 or pallet 170 in preparation for shipment to another third party storage facility, such as Iron Mountain, Incorporated. In the illustrative embodiment, media cartridges 110 and 112 move from secure environment 100 to storage rack 160 along path 180. Storage rack 160 is similar to media storage units 120 through 124 in secure environment 100, except that storage rack 160 is located outside secure environment 100. Storage rack 160 may be a staging area prior to moving the media cartridges, such as media cartridges 110 and 112 to a third party storage facility. Storage rack 160 also can be another storage area for any other storage purpose.

In the illustrative embodiment, media cartridges 110 and 112 move from storage rack 160 to pallet 170 along path 182. Pallet 170 is a mechanism for storing and easily transporting a plurality of media cartridges, such as media cartridges 110 and 112. Pallet 170 can be used as another storage area or for transporting media cartridges to another location in the facility or to a third party. In the illustrative embodiment, pallet 170 travels outside the facility along path 184 for storage at another third party storage facility.

The movement of media cartridges 110 and 112 are not limited to the illustrated embodiments. Media cartridges 110 and 112 can move directly from secure environment 100 to pallet 170. Media cartridges 110 and 112 can also move to other locations not depicted in the illustrative embodiment.

Figure 2:
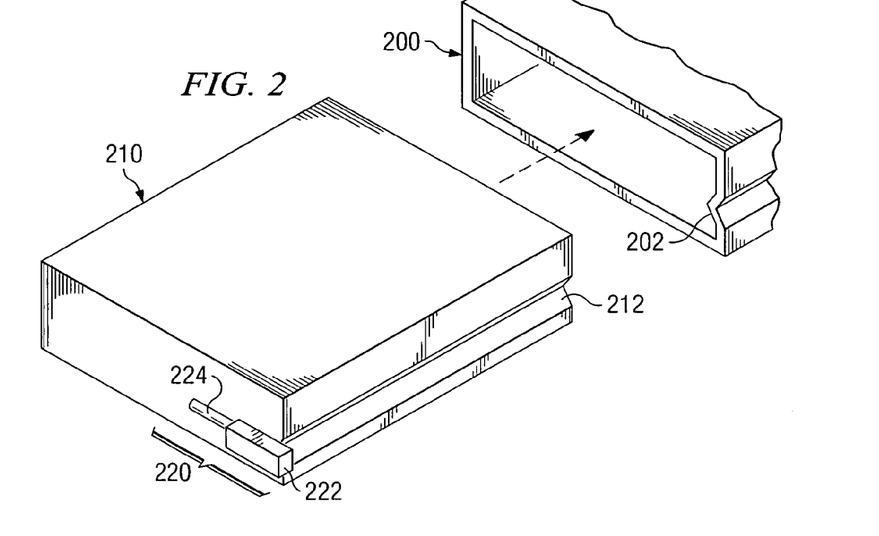
FIG. 2 illustrates a media cartridge with an actuated stop in the actuated position in which aspects of the present invention may be implemented.

FIG. 2 illustrates a media cartridge with an actuated stop in which aspects of the present invention may be implemented. Portal 200 is similar to portal 140 of FIG. 1. Portal 200 is an opening to a secure environment, such as secure environment 100 of FIG. 1, which allows media cartridges, such as media cartridge 210, to pass through. Portal 200 can be any shape, such as a square, rectangle, or circle, and is made of a sturdy material, such as a plastic resin, metal, or any combination thereof. In the illustrative embodiment, portal 200 is rectangular in shape and made out of a plastic resin.

Portal 200 includes mating slot 202. Mating slot 202 is the corresponding piece to slot 212 on media cartridge 210. Mating slot 202 has the same dimension and shape as slot 212 but is the male counterpart to slot 212. Mating slot 202 is designed so that slot 212 can slide along mating slot 202 when media cartridge 210 passes through portal 200. In other words, mating slot 212 mates with slot 202 to join media cartridge 210 with portal 200 when media cartridge 210 slides through portal 200. Mating slot 202 can be any shape, including but not limited to triangular, semi-circular, or rectangular. In the illustrative example, mating slot 202 is triangular in shape.

Portal 200 is sized and dimensioned so that media cartridge 210 can easily pass into and out of a secure environment. Portal 200 is limited so that the user cannot bypass mating slot 202. In these examples, slot 212 must slide along mating slot 202. In the illustrative embodiment, portal 200 is approximately ¾ inch in height and 5 inches in width and length. However, portal 200 is not limited to the described dimensions and may be smaller or larger than the illustrated embodiment.

Media cartridge 210 includes slot 212 and actuated stop 220. Media cartridge 210 can be any number of shapes to accommodate the appropriate media being stored in the secure environment. Slot 212 is the female counterpart to mating slot 202. Slot 212 is disposed along an edge of media cartridge 210. Disposed means along a single or multiple edges of media cartridge 210. Slot 212 can travel the entire length or only partially along the length of media cartridge 210.

Actuated stop 220 connects to media cartridge 210. In the illustrative embodiment, actuated stop 220 is distal to the edge that first enters portal 200. However, actuated stop 220 can also be located on the proximate edge of media cartridge 210 or any point between the distal and proximate edge of media cartridge 210.

Actuated stop 220 includes stop 222 and pin 224. Stop 222 connects to pin 224 and slides axially along pin 224. Stop 222 can be any shape, such as rectangular, cylindrical, or elliptical, and can be made from a plastic resin, metal, or any combination thereof. In the illustrative embodiment, stop 222 is rectangular in shape and made from a plastic resin.

Stop 222 needs to be durable enough to prevent media cartridge 210 from sliding through portal 200 when stop 222 is actuated. In the illustrative embodiment, stop 222 is in the actuated position. Actuated means that stop 222 is in the "on" position and overhangs the edge that has slot 212. Thus, when stop 222 is actuated, stop 222 engages mating slot 202 and prevents media cartridge 210 from completely sliding through portal 200 and leaving the secure environment.

Stop 222 is actuated by a robot or a switch located in mating slot 202. The robot is similar to robot 130 of FIG. 1. In one embodiment, the robot in the secure environment receives a software controlled signal to either actuate or not actuate stop 222. The robot then responds to the signal and physically moves stop 222 to the appropriate position. In another embodiment, a switch (not shown) in portal 200 acts to actuate stop 222. The switch in portal 200 can be located in mating slot 202 or any other location on portal 200. The switch can be a software controlled electrical or magnetic switch or an electro-mechanical mechanical switch that physically moves stop 222 to the appropriate position.

Stop 222 slides axially along pin 224 to change positions from actuated to non-actuated and vice-versa. Pin 224 can be made from a plastic resin, metal, or any combination thereof. Pin 224 is sized and dimensioned so that stop 222 can slide along pin 224. In the illustrative embodiment, pin 224 is approximately ¼ of an inch, and stop 220 is ¹⁄₁₆ of an inch in length and ¹⁄₃₂ of an inch in width.

Figure 3:
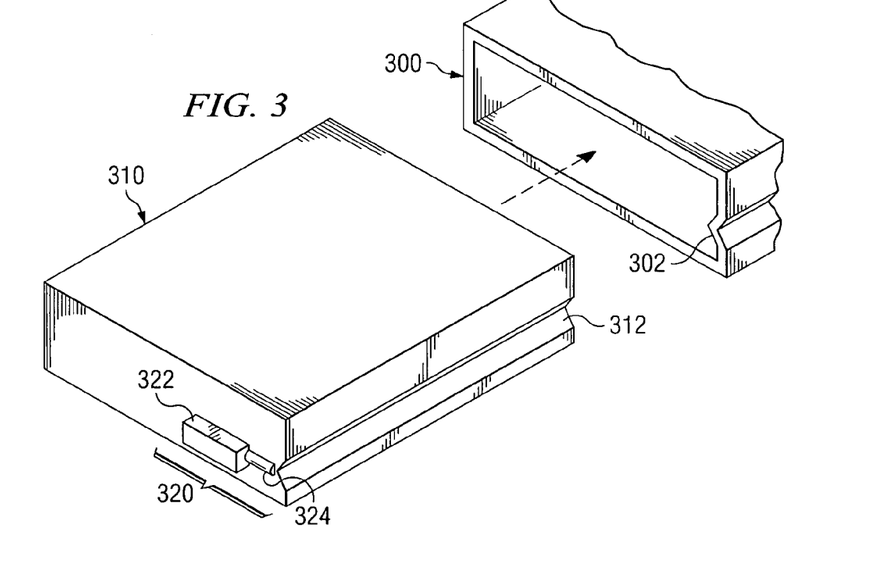
FIG. 3 illustrates a media cartridge with an actuated stop in the non-actuated position in which aspects of the present invention may be implemented.

FIG. 3 illustrates a media cartridge with an actuated stop in the non-actuated position in which aspects of the present invention may be implemented. FIG. 3 is similar to FIG. 2, except that FIG. 3 illustrates an actuated stop in the non-actuated position. Portal 300 is similar to portal 140 of FIG. 1 and portal 200 of FIG. 2. Portal 300 is an opening to a secure environment, such as secure environment 100 of FIG. 1. Portal 300 allows media cartridges, such as media cartridge 310, to pass through. Portal 300 includes mating slot 302, which is the male counterpart to slot 312 on media cartridge 310.

Media cartridge 310 includes slot 312 and actuated stop 320. In the illustrative embodiment, slot 312 is disposed along the entire length of one edge of media cartridge 310. Also, in the illustrative embodiment, actuated stop 320 connects to media cartridge 310 distal to the edge that first enters portal 300. Actuated stop includes stop 322 and pin 324. Stop 322 connects to pin 324 and slides axially along pin 324.

In the illustrative embodiment, stop 322 is in a non-actuated position. In other words, stop 322 is in the "off" position and does not overhang slot 312. When stop 322 is not actuated, media cartridge 310 can slide through mating slot portal 300. Stop 322 does not engage mating slot 302 and allows media cartridge 310 to be removed from the secure environment.

Figure 4:
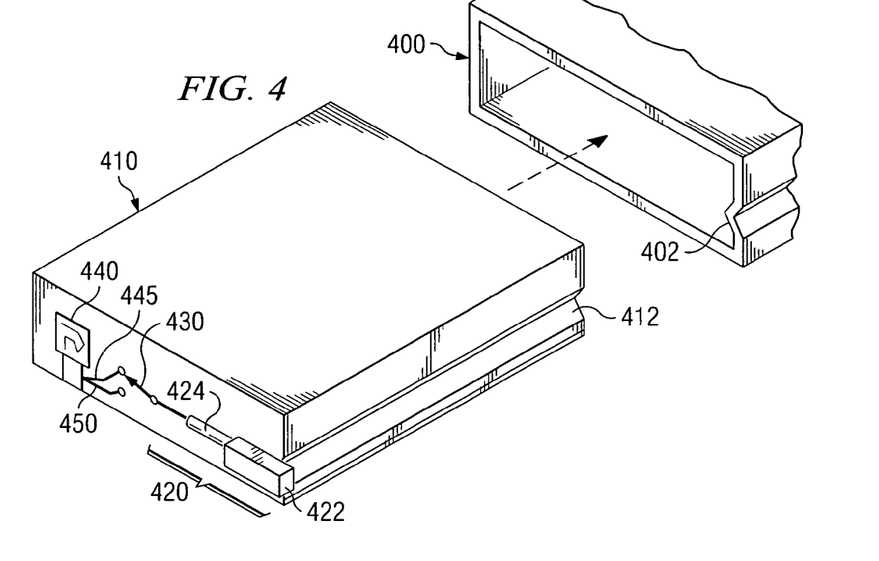
FIG. 4 illustrates a media cartridge with a switch using the first antenna in which aspects of the present invention may be implemented.

FIG. 4 illustrates a media cartridge with a switch using the first antenna in which aspects of the present invention may be implemented. Portal 400 is similar to portal 140 of FIG. 1 and portal 200 of FIG. 2. Portal 400 is an opening to a secure environment, such as secure environment 100 of FIG. 1. Portal 400 allows media cartridges, such as media cartridge 410, to pass through. Portal 400 includes mating slot 402, which is the male counterpart to slot 412 on media cartridge 410.

Media cartridge 410 includes slot 412 and actuated stop 420. In the illustrative embodiment, slot 412 is disposed along the entire length of one edge of media cartridge 410. Also, in the illustrative embodiment, actuated stop connects to media cartridge 410 distal to the edge that first enters portal 400. Actuated stop 420 includes stop 422 and pin 424. Stop 422 connects to pin 424 and slides axially along pin 424.

In the illustrative embodiment, stop 422 is in the actuated position. In other words, stop 422 is in the "on" position and will prevent media cartridge 410 from leaving the secure environment through portal 400.

Actuated stop 420 also connects to switch 430. Switch 430 is a single throw double pole switch and actuates between two modes: first antenna 440 and second antenna (not shown). Both first antenna 440 and the second antenna transmit the location of media cartridge 410. First antenna 440 transmits signals within a discrete environment, such as secure environment 100 of FIG. 1. In these examples, first antenna 440 transmits signals within a short range and usually does not operate outside a secure environment. First antenna 440 operates within a short range to limit the signal interference of other media cartridges inside and outside the secure environment. The limited signal interference minimizes cross-communication from other media cartridges and allows media cartridge 410 to individually communicate with transponders and other signal units within the secure environment. The second antenna transmits signals within a larger range and usually operates when media cartridge 410 leaves the secure environment. In the illustrative embodiment, the second antenna transmits signals between one inch and up to thirty feet from the closest transponder. However, in other embodiments, the second antenna can operate in shorter or longer ranges.

First antenna 440 and the second antenna can be an active or passive antenna. An active antenna operates with an energy source, such as a battery. A passive antenna operates without any energy source but receives energy from a reader, such as a transponder similar to transponders 150, 152, 154, and 156 of FIG. 1. For example, in one embodiment, second antenna can be an active antenna. In other words, second antenna utilizes its own energy source to transmit a location signal to the transponder. For example, in another embodiment, second antenna can be a passive antenna and receive transferred energy from the transponder in order to communicate a location signal to the transponder. The aspects of the present invention are not limited to the examples presented and can include any other types and combinations of active or passive antennas.

In the illustrative embodiment, first antenna 440 connects to media cartridge 410 distal to the edge that first enters portal 400. The second antenna is not shown in FIG. 4 but is also connected to media cartridge 410. Switch 430 connects to first antenna 440 through first antenna connection 445 and the second antenna through second antenna connection 450. Both first antenna connection 445 and second antenna connection 450 are a wired connection. Switch 430 toggles between first antenna connection 445 and second antenna connection 450 depending upon the mode of operation for media cartridge 410. The mode of operation is directly related to where media cartridge 410 is in relation to the secure environment. Thus, if media cartridge 410 is within the secure environment, switch 430 operates in the first mode, or, in other words, switch 430 connects to first antenna connection 445 and first antenna 440 is "on." On the other hand, if media cartridge 410 is outside the secure environment, switch 430 operates in the second mode, or, in other words, switch 430 connects to second antenna connection 450 and the second antenna is "on."

The location of actuated stop 420 is also dependent upon the mode of operation for media cartridge 410. If media cartridge 410 is operating in the first antenna mode, then stop 422 will be actuated and prevent media cartridge 410 from leaving the secure environment through portal 400. If media cartridge 410 is operating in the second antenna mode, then stop 422 will not be actuated and will allow media cartridge 410 to leave the secure environment through portal 400. Stop 422 will remain non-actuated until media cartridge returns to the secure environment. In the illustrative embodiment, switch 430 is connected to first antenna connection 445 and therefore operating in first mode. Consequently, in the illustrative embodiment, actuated stop 420 is in the actuated position.

The aspects of the present invention also allow for first antenna 440 to operate simultaneously with or independently of the second antenna by changing switch 430 from a single throw double pole switch to a double throw double pole switch. In the embodiment when both first antenna 440 and the second antenna operate simultaneously, then actuated stop 420 would not be actuated. Additionally, in the embodiment when the second antenna operates independently, then actuated stop 420 would also not be actuated. Only in the situation when first antenna 440 is operating independently will actuated stop 420 be actuated. Switch 430 can also be implemented in other ways and is not limited to the illustrative embodiments.

Figure 5:
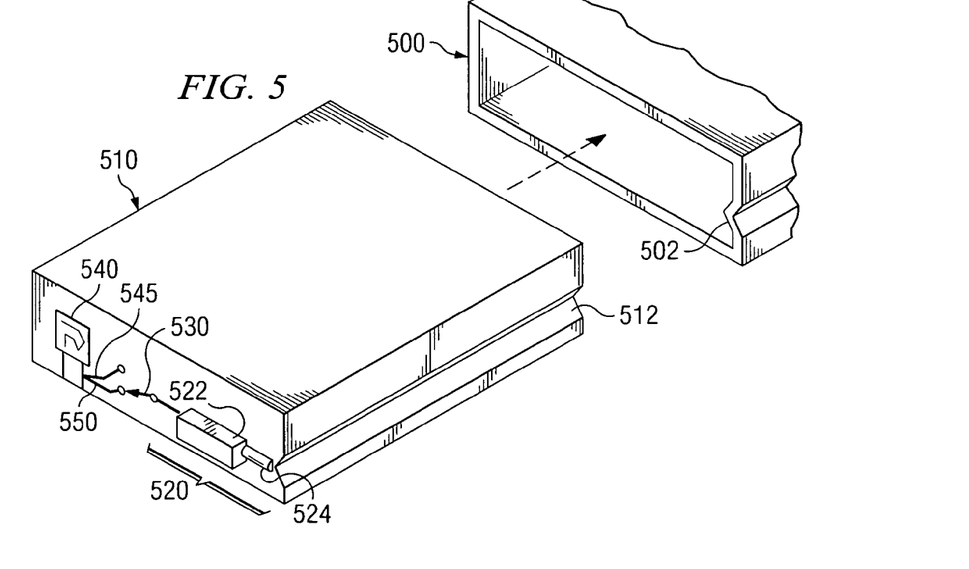
FIG. 5 illustrates a media cartridge with a switch using the second antenna in which aspects of the present invention may be implemented.

FIG. 5 illustrates a media cartridge with a switch operating in second mode in which aspects of the present invention may be implemented. FIG. 5 is similar to FIG. 4, except that FIG. 5 illustrates the media cartridge operating in second mode instead of first mode. Portal 500 is similar to portal 140 of FIG. 1 and portal 200 of FIG. 2. Portal 500 is an opening to a secure environment, such as secure environment 100 of FIG. 1. Portal 500 allows media cartridges, such as media cartridge 510, to pass through. Portal 500 includes mating slot 502, which is the male counterpart to slot 512 on media cartridge 510.

Media cartridge 510 includes slot 512 and actuated stop 520. In the illustrative embodiment, slot 512 is disposed along the entire length of one edge of media cartridge 510. Also, in the illustrative embodiment, actuated stop 520 connects to media cartridge 510 distal to the edge that first enters portal 500. Actuated stop 520 includes stop 522 and pin 524. Stop 522 connects to pin 524 and slides axially along pin 524.

In the illustrative embodiment, first antenna 540 connects to media cartridge 510 distal to the edge that first enters portal 500. The second antenna is not shown in FIG. 5 but is also connected to media cartridge 510. Switch 530 connects to first antenna 540 through first antenna connection 545 and the second antenna through second antenna connection 550.

In the illustrative embodiment, switch 530 connects to second antenna connection 550 and is operating in the second antenna mode. Actuated stop 520 is also in the "off" position and not actuated. Therefore, in the illustrative embodiment, media cartridge 510 is allowed to leave the secure environment through portal 500. Once media cartridge 510 enters into the same or another secure environment, media cartridge 510 can switch to operate in the first antenna mode again.

Figure 6:
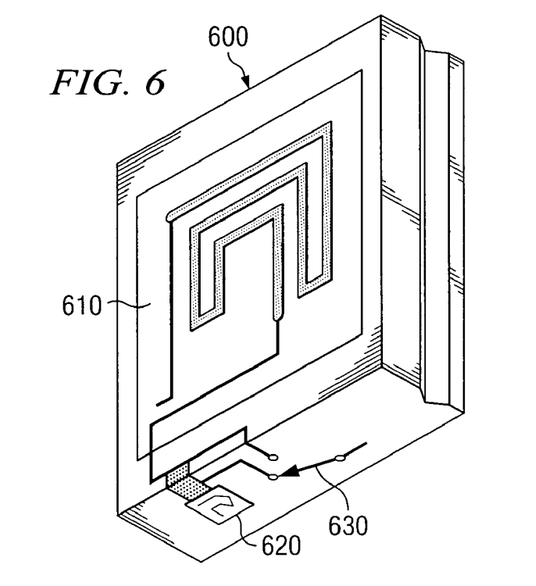
FIG. 6 illustrates a media cartridge with a first antenna and a second antenna in which aspects of the present invention may be implemented.

FIG. 6 illustrates a media cartridge with a first antenna and a second antenna in which aspects of the present invention may be implemented. Media cartridge 600 connects to second antenna 610 and first antenna 620. Both second antenna 610 and first antenna 620 are disposed on one face of media cartridge 600. In the illustrative embodiment, second antenna 610 is disposed on a different face than first antenna 620.

Second antenna 610 and first antenna 620 connect to switch 630. In the illustrative embodiment, switch 630 connects to second antenna 610 and thus media cartridge 600 is operating under the second mode.

Both second antenna 610 and first antenna 620 are radio frequency identification (RFID) antennas. Thus, both antennas transmit radio frequency waves to a transponder. In the illustrative embodiment, the antennas transmit the location of media cartridge 600. Both antennas can operate either in an active or passive mode.

Figure 7:
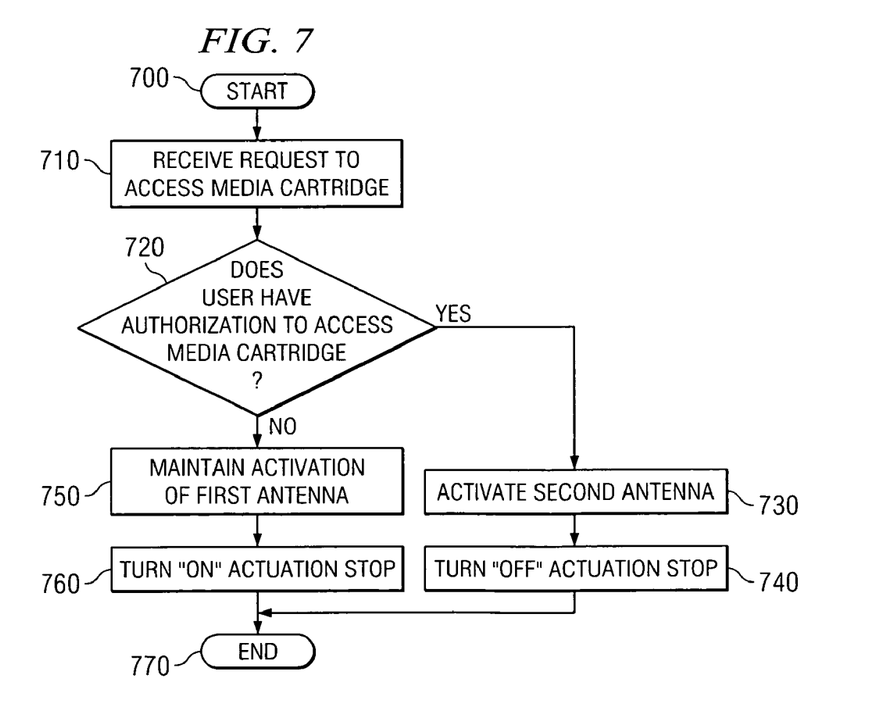
FIG. 7 is a flowchart of the process for tracking the location of a media cartridge, in accordance with an illustrative embodiment of the present invention.

FIG. 7 is a flowchart of the process for tracking the location of a media cartridge, in accordance with an illustrative embodiment of the present invention. The method begins (step 700) with the media cartridge receiving a request to access the media cartridge (step 710). A determination is then made as to whether the user has authorization to access the media cartridge (step 720). If the user does have authorization ("yes" output of step 720), then the media cartridge activates the second antenna (step 730) and turns the actuation stop into the "off" position (step 740). The process then ends (step 770).

If the user does not have authorization ("no" output of step 720), then the media cartridge maintains activation of the first antenna (step 750) and turns the actuation stop to the "on" position (step 760). The process then terminates (step 770).

The aspects of the present invention provide a device for tracking, a method for tracking, and a method for building the device for tracking the location of a media cartridge. The device includes a first antenna and a second antenna connected to the media cartridge. The second antenna has a range that is longer than the first antenna. The device also includes a switch that operates in a first mode and a second mode. When operating in the first mode, the first antenna is operable. When operating the second mode, the second antenna is operable. The aspects of the present invention also provide that the first antenna can be operable at the same time the second antenna is operable.

The aspects of the present invention also provide a slot disposed along the edge of the media cartridge and an actuating stop connected to the media cartridge. The slot is adapted to mate with a portal. When actuated, the actuating stop prevents the media cartridge from leaving the secure environment. When not actuated, the actuating stop allows the media cartridge to pass through the portal thus permitting the media cartridge to leave the secure environment.

The aspects of the present invention also provide for the actuating stop to work in conjunction with the switch on the media cartridge. Thus, when operating in the first antenna mode, the actuating stop is actuated and prevents the media cartridge from leaving the secure environment. When operating in the second antenna mode, the actuating stop is not actuated and allows the media cartridge to pass through the portal.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A device for tracking a location of a media cartridge, the device comprising:
 a first antenna connected to the media cartridge;
 a second antenna connected to the media cartridge, wherein the second antenna has a range that is longer than the first antenna;
 a switch, wherein the switch allows the media cartridge to operate in a first mode and a second mode, wherein in the first mode the first antenna is operable, and wherein in the second mode the second antenna is operable; and
 a stop connected to the media cartridge, wherein the stop is movable between a position that prevents the media cartridge from passing through a portal and a position that permits the media cartridge to pass through the portal, and wherein movement of the stop actuates the switch.

2. The device of claim 1 wherein the first mode is operable when the media cartridge is located within a secure environment, and wherein the second mode is operable when outside the secure environment.

3. The device of claim 1, wherein the stop is actuated when the media cartridge operates in the first mode, and wherein the stop is not actuated when the media cartridge operates in the second mode.

4. The device of claim 2, wherein the stop comprises:
 a pin disposed along an edge of the media cartridge; and
 wherein the stop is connected to the pin and is movable axially along the pin.

5. The device of claim 1 wherein the media cartridge operates exclusively in the first mode or the second mode.

6. A method of tracking a location of a media cartridge, the method comprising:
 providing a first antenna for use when the media cartridge is located within a secure environment;
 providing a second antenna for use when the media cartridge is located outside the secure environment, wherein the second antenna has a range that is longer than the first antenna;
 actuating a switch, wherein the switch allows operation of the media cartridge in a first mode and a second mode, wherein in the first mode the first antenna is operable, and wherein in the second mode the second antenna is operable; and
 moving a stop between a position that prevents the media cartridge from passing through a portal and a position that permits the media cartridge to pass through the portal, wherein movement of the stop actuates the switch.

7. The method of claim 6, wherein the stop is actuated when the media cartridge operates in the first mode, and wherein the stop is not actuated when the media cartridge operates in the second mode.

8. The method of claim 6, wherein the stop comprises:
 a pin disposed along an edge of the media cartridge; and
 wherein the stop is connected to the pin and is movable in an axial direction along the pin.

9. The method of claim 6, wherein
 the media cartridge operates exclusively in the first mode or the second mode.

10. A method of making a device for tracking a location of a media cartridge, the method comprising:
 connecting a first antenna to the media cartridge;
 connecting a second antenna to the media cartridge, wherein the second antenna has a range that is longer than the first antenna;
 connecting a switch to the media cartridge, wherein the switch allows the media cartridge to operate in a first mode and a second mode, wherein in the first mode the first antenna is operable, and wherein in the second mode the second antenna is operable;
 connecting a stop to the media cartridge, wherein the stop is movable between a position that prevents the media cartridge from passing through a portal and a position that permits the media cartridge to pass through the portal, and wherein movement of the stop actuates the switch.

11. The method of claim 10 wherein the first mode is operable when the media cartridge is located within a secure environment, and wherein the second mode is operable when outside the secure environment.

12. The method of claim 10, wherein the stop is actuated when the media cartridge operates in the first mode, and wherein the stop is not actuated when the media cartridge operates in the second mode.

13. The method of claim 10, wherein connecting a stop to the media cartridge comprises:
   connecting a pin disposed along an edge of the media cartridge; and
   connecting the stop to the pin, wherein the stop moves axially along the pin.

14. The method of claim 10, wherein
   the media cartridge operates exclusively in the first mode of or the second mode.

* * * * *

UNITED STATES PATENT AND TRADEMARK OFFICE
CERTIFICATE OF CORRECTION

| | | |
|---|---|---|
| PATENT NO. | : 7,656,608 B1 | Page 1 of 1 |
| APPLICATION NO. | : 11/343420 | |
| DATED | : February 2, 2010 | |
| INVENTOR(S) | : Dale R. Eichel | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this

Twenty-eighth Day of December, 2010

David J. Kappos
*Director of the United States Patent and Trademark Office*